US010316969B2

(12) United States Patent
Herrmann et al.

(10) Patent No.: US 10,316,969 B2
(45) Date of Patent: Jun. 11, 2019

(54) HYDRAULIC VALVE SYSTEM OF A PARKING LOCK DEVICE

(71) Applicant: ZF Friedrichshafen AG, Friedrichshafen (DE)

(72) Inventors: Markus Herrmann, Scheidegg (DE); Thilo Schmidt, Meckenbeuren (DE); Tobias Rolser, Berg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 54 days.

(21) Appl. No.: 15/629,883

(22) Filed: Jun. 22, 2017

(65) Prior Publication Data

US 2017/0370468 A1 Dec. 28, 2017

(30) Foreign Application Priority Data

Jun. 24, 2016 (DE) .......... 10 2016 211 391

(51) Int. Cl.
*F16H 63/34* (2006.01)
*B60T 13/66* (2006.01)
(Continued)

(52) U.S. Cl.
CPC .......... *F16H 63/3483* (2013.01); *B60T 1/005* (2013.01); *B60T 1/062* (2013.01); (Continued)

(58) Field of Classification Search
CPC ...... F16H 63/3483; B60T 1/005; B60T 1/062; B60T 13/662; B60T 13/686; F16D 63/006; F16D 2500/50866
See application file for complete search history.

(56) References Cited

U.S. PATENT DOCUMENTS

2002/0092720 A1* 7/2002 Schafer ................... B60T 1/005
                                                         188/158
2011/0146439 A1* 6/2011 Saitner ............... F16H 63/3491
                                                         74/473.25
(Continued)

FOREIGN PATENT DOCUMENTS

DE  102013209932 A1  12/2014
DE  102015211298 A1  12/2016
KR  2017113914  * 10/2017 ............. F16D 55/10

*Primary Examiner* — Jacob S. Scott
*Assistant Examiner* — Murad Jahmani
(74) *Attorney, Agent, or Firm* — Dority & Manning, P.A.

(57) ABSTRACT

An electrohydraulic transmission control system (1) includes a parking lock valve (2). The electrohydraulic transmission control system (1) is configured such that, during normal operation of the electrohydraulic transmission control system (1) in which at least one electrohydraulic pressure adjuster (EDSSYS) is actuatable with current, the parking lock valve (2) can be held in a defined operating state in which an actuation pressure (p_sys) acts on a parking lock cylinder (3) above a normal pressure level. The electrohydraulic transmission control system (1) is configured such that, during emergency operation of the electrohydraulic transmission control system (1) in which the at least one electrohydraulic pressure adjuster (EDSSYS) is not fed with current and the actuation pressure (p_sys) is at least temporarily set to an emergency pressure level higher than the normal pressure level by the at least one pressure source (7), a pressure level of the actuation pressure (p_sys) that holds the parking lock valve (2) in the defined operating state corresponds at least approximately to the emergency pressure level.

15 Claims, 8 Drawing Sheets

(51) Int. Cl.
  *B60T 13/68* (2006.01)
  *B60T 1/06* (2006.01)
  *B60T 1/00* (2006.01)
  *F16D 63/00* (2006.01)

(52) U.S. Cl.
  CPC .......... *B60T 13/662* (2013.01); *B60T 13/686* (2013.01); *F16D 63/006* (2013.01)

(56) References Cited

U.S. PATENT DOCUMENTS

2016/0341311 A1\* 11/2016 Watanabe ........... F16H 63/3483
2016/0369893 A1   12/2016 Herrmann et al.
2017/0320478 A1\* 11/2017 Tamai .................... F16H 61/04

\* cited by examiner

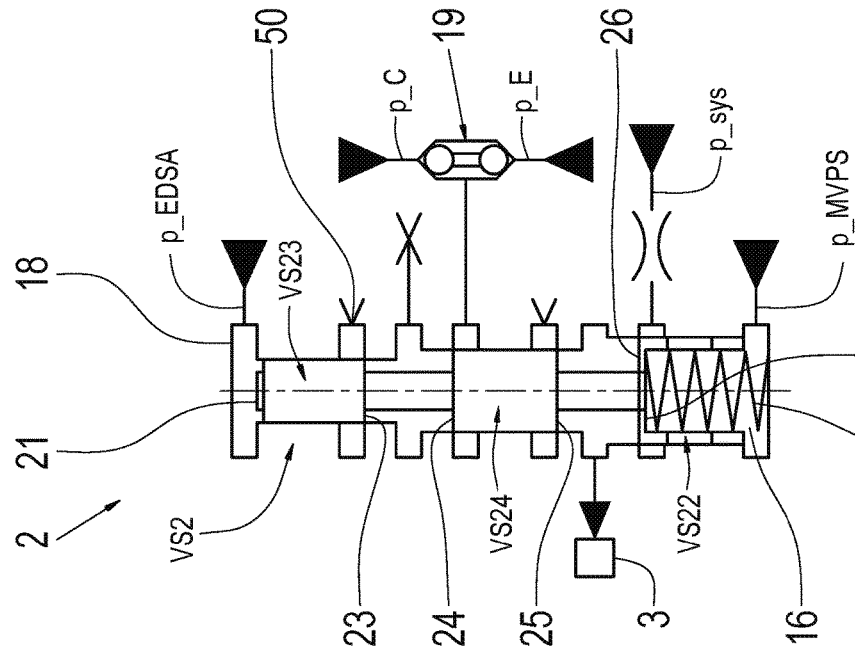
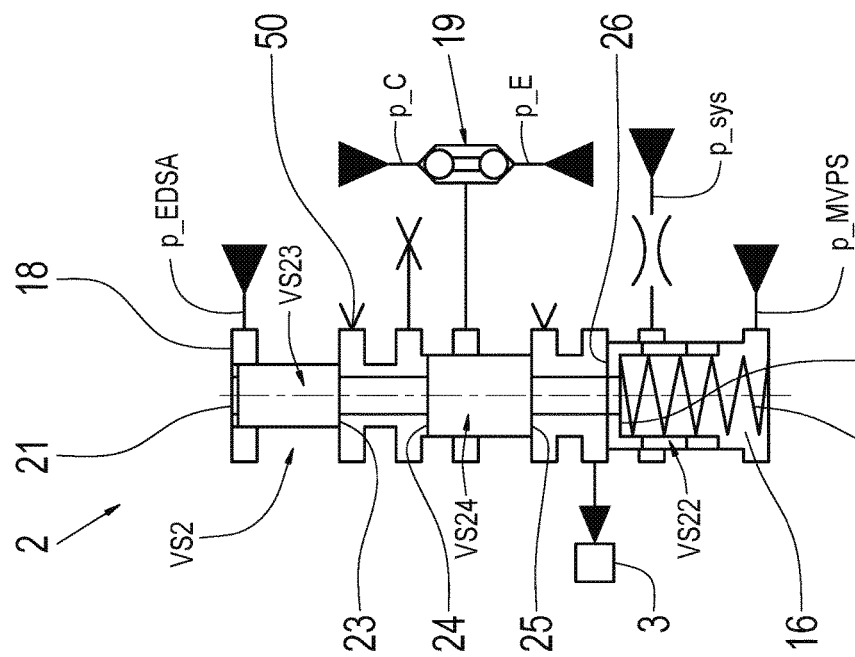

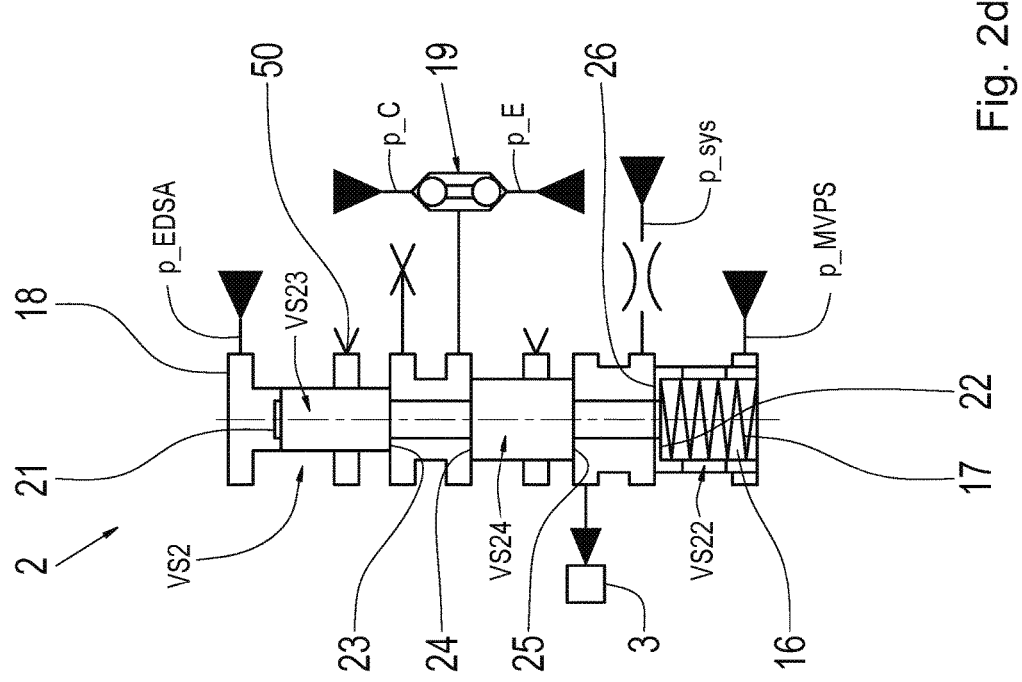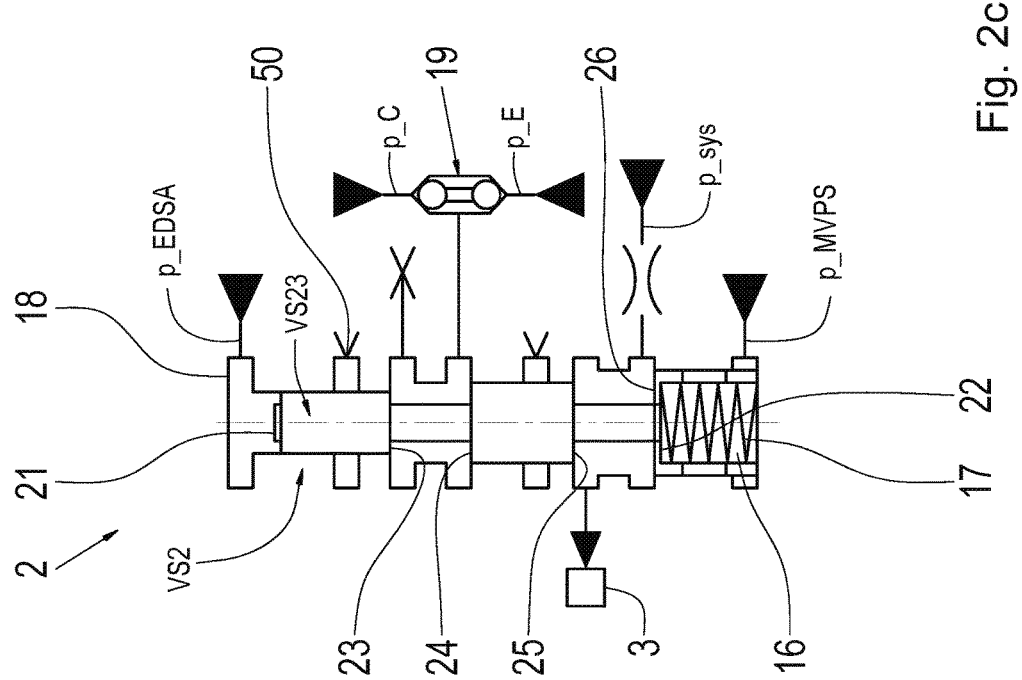

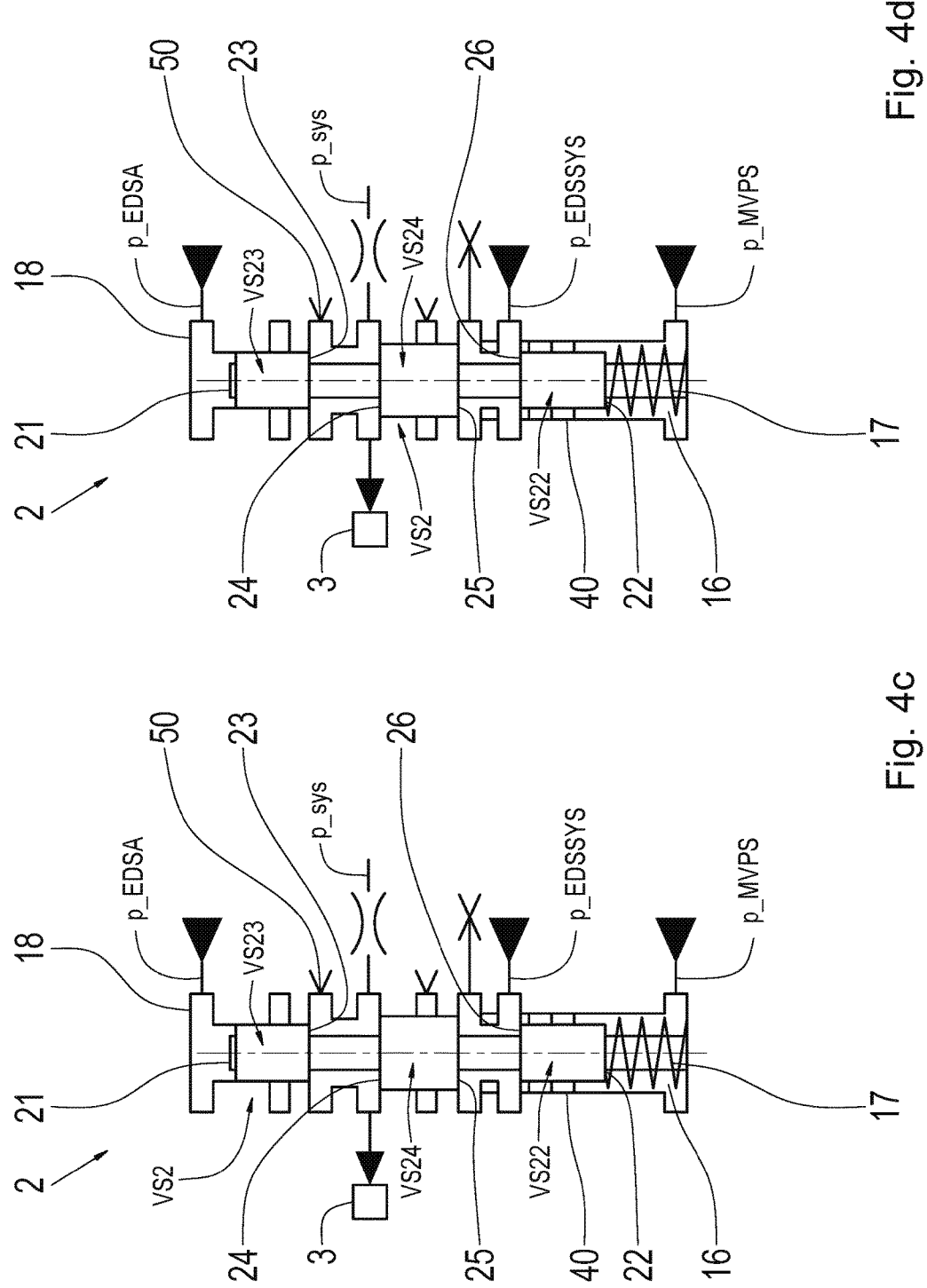

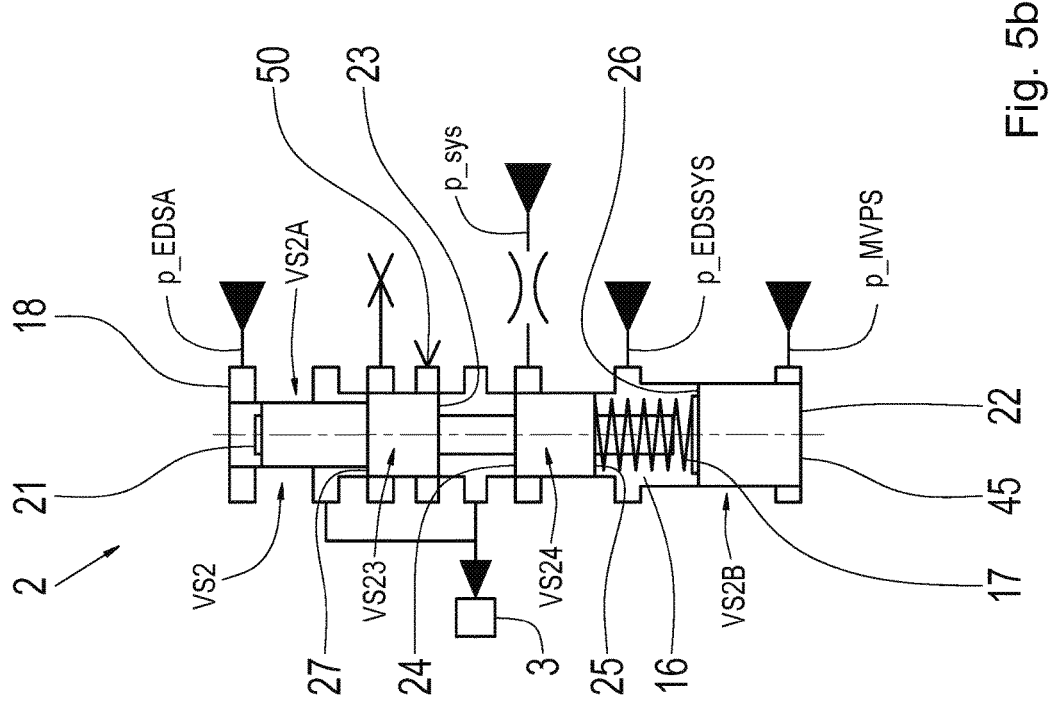
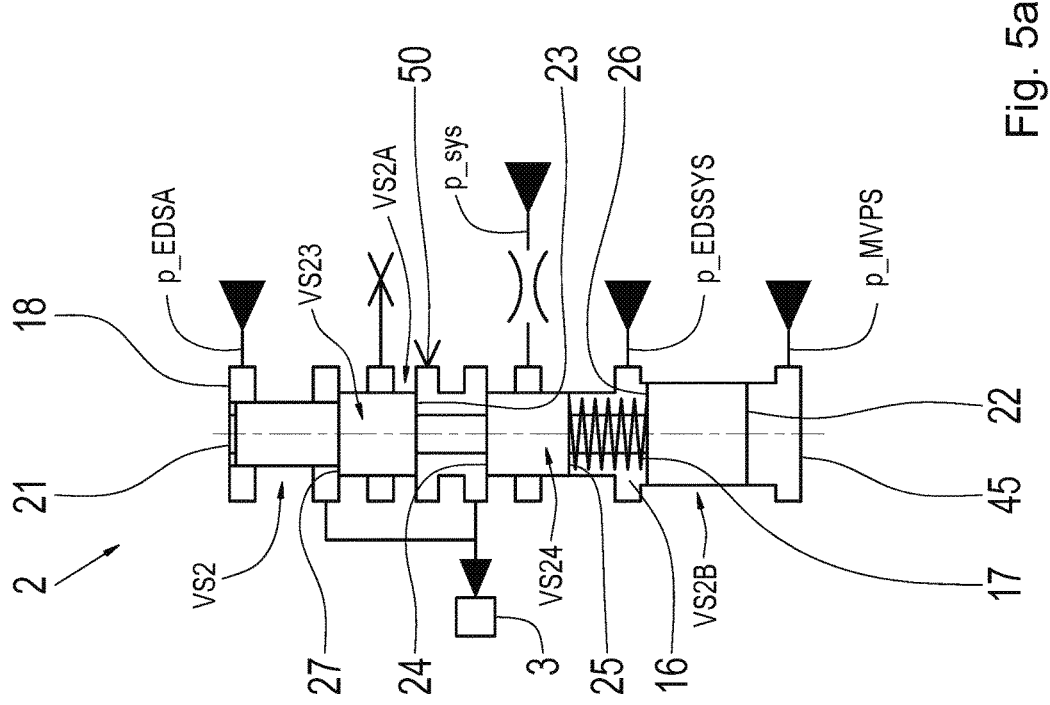
Fig. 5b
Fig. 5a

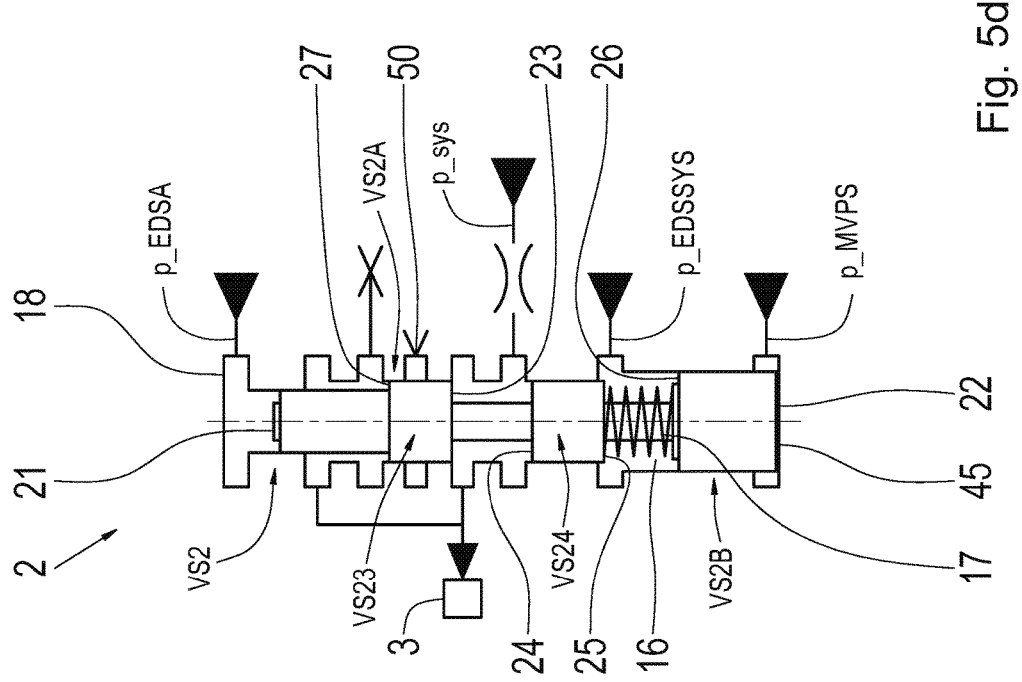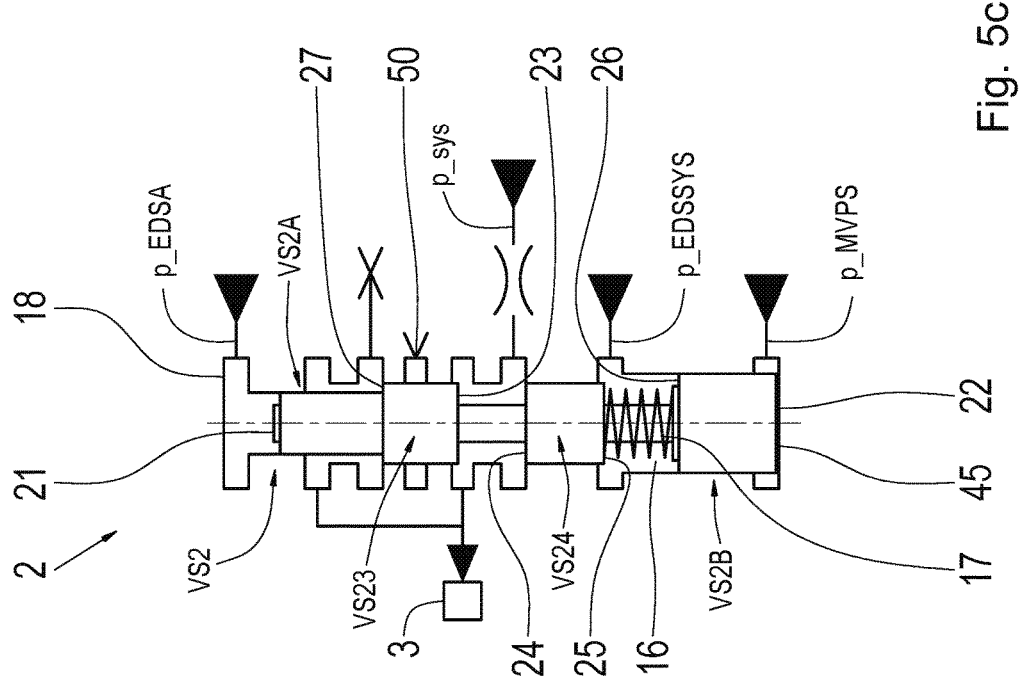

HYDRAULIC VALVE SYSTEM OF A PARKING LOCK DEVICE

FIELD OF THE INVENTION

The invention relates generally to an electrohydraulic transmission control system having a parking lock valve.

BACKGROUND

The applicant's patent application DE 10 2015 211 298.5, which does not constitute a prior publication, discloses a hydraulic system of an automatic transmission having a hydraulically actuable parking lock unit. A parking lock valve is configured with multiple valve pockets formed in the region of a valve housing, by which an actuation pressure of the parking lock unit, which actuation pressure prevails in a manner dependent on a supply pressure, can be applied to said parking lock unit. The valve pockets can be placed in operative connection with one another, or separated from one another, by a valve slide which is longitudinally displaceable in the valve housing. The valve slide is spring-loaded in the direction of a first axial position which corresponds to a first operating state of the parking lock valve and in which, in turn, an actuation pressure can be applied to the parking lock unit at which the parking lock transitions into the engaged operating state. In the region of a control surface of the valve slide, a pressure signal which acts in the direction of a second axial position of the valve slide, which corresponds to a second operating state of the parking lock valve, can be introduced by applying an actuation pressure to the parking lock unit, which actuation pressure transfers a parking lock of the parking lock unit into the disengaged operating state.

If a fault arises in the transmission system during operation with the parking lock disengaged, which fault leads to the deactivation of the electrical supply of the transmission actuators, the automatic transmission switches to so-called hydraulic emergency operation. During hydraulic emergency operation the parking lock valve is held in the operating state which corresponds to the disengaged operating state of the parking lock, by the pressure in the primary system pressure circuit in the region of a control surface of the valve slide of the parking lock valve, which control surface corresponds to a differential surface between two facing face surfaces of two valve slide sections configured with different diameters, counter to the spring force, until the system pressure falls below a defined pressure threshold which is dependent on the size of the differential surface and on the spring force.

Said pressure threshold is configured for driving states in which a clutch gear logic is implemented without actuation of a shift element which is actuated by the pressure signal. In the absence of a pressure signal and in the presence of a simultaneously low torque to be transmitted via the automatic transmission, the hydraulic system is operated with a low system pressure level in order to improve an efficiency of the automatic transmission. This means that, for the least possible power consumption of the transmission system, it is sought to achieve the lowest possible system pressures in the consumption-relevant operating range. This however has the result that the self-holding pressure of the parking lock valve lies below the minimum system pressure level, because otherwise, the parking lock cannot, in the presence of low system pressures, be held any longer in the disengaged operating state by the system pressure.

Owing to the selection of the features of the characteristic curves of the actuators, the shift elements of the automatic transmission are, in emergency operation, actuated in unpressurized fashion, while the system pressure assumes its maximum value. In the event of a transition to hydraulic emergency operation, it is additionally the case that the electromechanical locking mechanism of the parking lock is deactivated, with the result that inadequate hydraulic actuation of the parking lock device during emergency operation results in an immediate actuation of the parking lock device in the direction of the engaged operating state.

To be able to briefly compensate undersupplied operating states of the hydraulic system during a normal operating state of the automatic transmission, and to be able to operate the automatic transmission with high spontaneity over a large operating range of a vehicle drivetrain, it is possible for the above-described primary system pressure circuit to be implemented with a hydraulic fluid volume accumulator known from DE 10 2013 209 932 A1. For this purpose, a hydraulic fluid volume is temporarily stored counter to a spring force of a spring device in the region of the hydraulic fluid volume accumulator, which hydraulic fluid volume can, in accordance with demand, be introduced into the line system of the hydraulic system downstream of a check valve device. During hydraulic emergency operation of the automatic transmission, the hydraulic fluid volume accumulator is fully charged by the system pressure set to a maximum, and is preloaded to its maximum pressure value.

If a vehicle in which the transmission is in hydraulic emergency operation is shut down, a transmission main pump driven by the drive machine conveys no further hydraulic fluid volume into the hydraulic system, as is known. The previously set maximum system pressure thereby collapses, until it reaches the maximum pressure level of the hydraulic fluid volume accumulator. From this point in time onward, all actuated pressures in the hydraulic system are determined by the discharge pressure of the hydraulic fluid volume accumulator, and as a result both the system pressure and a pressure set with a falling characteristic curve in the region of a system pressure regulator assume the same pressure level.

From said point in time onward the gradient with which the system pressure in the primary pressure circuit is dissipated is dependent only on the leakage of the primary pressure circuit, and is thus highly dependent on the present operating temperature of the transmission. In particular in the presence of low operating temperatures, the leakage volume flows of the primary pressure circuit are very small. Since the minimum discharge pressure of the hydraulic fluid volume accumulator is above the self-holding pressure threshold of the parking lock valve, the engagement of the parking lock after the shutdown of the vehicle is delayed, however, to an undesired extent.

SUMMARY OF THE INVENTION

In example embodiments, the present invention provides an electrohydraulic transmission control system having a parking lock valve, by which a transmission can be operated in an as far as possible optimized manner in terms of efficiency and with high spontaneity, and by which a parking lock can, even in the event of a transition to emergency operation, be transferred into the engaged operating state within defined operating times.

In the case of the electrohydraulic transmission control system according to example aspects the invention having a parking lock valve by which a parking lock cylinder of a parking lock device can be charged with an actuation pressure which can be set in an operating-state-dependent manner by at least one electrohydraulic pressure adjuster and/or one pressure source, it is possible for the parking lock valve to be held in a defined operating state in which the actuation pressure acts on the parking lock cylinder during normal operation of the electrohydraulic transmission control system during which the electrohydraulic pressure adjuster is actuable with current and during which the actuation pressure is above a normal pressure level.

According to example aspects the invention, the electrohydraulic transmission control system is configured such that the pressure level of the actuation pressure for holding the parking lock valve in the defined operating state during emergency operation, during which the electrohydraulic pressure adjuster is not fed with current and the actuation pressure is at least temporarily set to an emergency pressure level higher than the normal pressure level by the pressure source, corresponds at least approximately to the emergency pressure level.

In this way, it is ensured in a simple manner during the normal operation of the electrohydraulic transmission control system that the parking lock device can be held in the disengaged operating state by a low actuation pressure which has an efficiency-optimized pressure level. At the same time, the pressure level of the actuation pressure for holding a parking lock valve in the defined operating state is, during emergency operation, increased to a higher pressure level in relation to normal operation. It is thereby ensured that a shutdown of a vehicle during emergency operation, and a hydraulic fluid volume accumulator discharging into a primary pressure circuit, do not impede a desired spontaneous engagement of a parking lock device.

In an advantageous variant of the electrohydraulic transmission control system, the parking lock valve, during normal operation of the electrohydraulic transmission control system, can be charged with a pressure signal which is adjustable in the region of a further electrohydraulic pressure adjuster and which can be applied to the parking lock valve in the direction of the defined operating state thereof. Thus, during normal operation of the electrohydraulic transmission control system, not only the actuation pressure of the parking lock device prevails at the parking lock valve but also, during defined operating states, a further pressure signal by which the parking lock valve can be actuated in the direction of the operating state which holds the parking lock device hydraulically in the disengaged state. During such operating state profiles, the actuation pressure can, in relation to an operating state of the parking lock valve during which the parking lock valve is held in its defined operating state by the actuation pressure alone, be reduced to an extent which improves the efficiency of the transmission, and it is still possible for the parking lock valve to be arrested in the defined operating state.

If the parking lock valve, during normal operation of the electrohydraulic transmission control system, can be charged with a pressure signal which is adjustable in the region of an additional electrohydraulic pressure adjuster and which can be applied to the parking lock valve in a direction of action counter to the defined operating state, the parking lock valve can be transferred, counter to the self-holding action, into an operating state in which the actuation pressure in the region of the parking lock valve is isolated from the parking lock cylinder and the parking lock device can be engaged as desired.

In a refinement of the electrohydraulic transmission control system that is expedient in terms of costs and installation space, the parking lock valve, during normal operation of the electrohydraulic transmission control system, can be charged with a pressure signal which corresponds to an actuation pressure of a shift element and which can be applied to the parking lock valve acting in the direction of the defined operating state thereof. In this embodiment of the electrohydraulic transmission control system, the actuation pressure that has to be imparted in order to realize the self-holding action of the parking lock valve can, in the presence of a correspondingly applied actuation pressure of the shift element, likewise be reduced to an extent which increases efficiency, whereby the transmission control system can be operated with a low system pressure which is expedient in terms of efficiency, without causing an undesired engagement of the parking lock.

In further advantageous embodiments of the electrohydraulic transmission control system according to the invention, the parking lock valve, during normal operation and/or emergency operation of the electrohydraulic transmission control system, can be charged, respectively, with a pressure signal which is adjustable in the region of the electrohydraulic pressure adjuster and which can be applied to the parking lock valve in a direction of action counter to the defined operating state.

Thus, the self-holding function of the parking lock valve can be deactivated by the pressure signal which can be adjusted in the region of the electrohydraulic pressure adjuster, or the self-holding threshold of the parking lock valve in the defined operating state can be varied. Furthermore, according to the invention, the self-holding threshold of the parking lock valve can be varied, even during emergency operation, by the pressure signal which can be adjusted in the region of the electrohydraulic pressure adjuster, in such a way that, when a vehicle is shut down proceeding from emergency operation, the parking lock device can be transferred into its engaged operating state within desired short operating times.

If the pressure signal which can be adjusted in the region of the electrohydraulic pressure adjuster can additionally be applied in the region of a system pressure valve, the actuation pressure being adjustable by the system pressure valve in a manner dependent on the pressure signal and on a pressure provided by a further pressure source, it is the case, with corresponding design of the electrohydraulic pressure adjuster, that the actuation pressure assumes its maximum value during emergency operation with little outlay, and the parking lock valve is reliably transferred into its defined operating state, in which the parking lock device is held in its disengaged operating state. Furthermore, the self-holding threshold of the parking lock valve during emergency operation is set to a pressure level such that an evacuation of a hydraulic fluid volume accumulator, which occurs upon shutdown of a vehicle, does not prevent a desired engagement of the parking lock device within defined operating times.

In a further advantageous embodiment of the electrohydraulic transmission control system according to the invention, the pressure level of the actuation pressure for holding the parking lock valve in its defined operating state is configured to be higher than the emergency pressure level if the pressure source is in the form of a pump device which provides the emergency pressure level, because a pump device permanently provides a constant pressure level.

By contrast to this, the pressure level of the actuation pressure for holding the parking lock valve in its defined operating state during emergency operation is configured to be higher or lower than the emergency pressure level by a defined pressure offset value, or is equal to the emergency pressure level, if the pressure source is in the form of a pressure medium accumulator which temporarily provides the emergency pressure level.

Here, in the design variant of the electrohydraulic transmission control system in which the pressure level of the actuation pressure for holding the parking lock valve in the defined operating state is higher than the emergency pressure level, it is reliably ensured that the evacuation of the pressure medium accumulator or of the hydraulic fluid volume accumulator does not delay the engagement of the parking lock device, whereas, in the case of the two further design variants, in which the pressure level of the actuation pressure is less than or equal to the emergency pressure level, at least short delays can occur before the engagement of the parking lock device.

In the two latter design variants, the parking lock device is transferred into the engaged operating state at the latest when the actuation pressure generated in the electrohydraulic transmission control system as a result of the evacuation of the pressure medium accumulator or, more specifically, of the hydraulic fluid volume accumulator decreases below the pressure level of the actuation pressure for holding the parking lock valve in the defined operating state during emergency operation.

In an embodiment of the electrohydraulic transmission control system which is of structurally simple design and which can be actuated with little outlay, the parking lock valve includes a valve slide which is arranged in longitudinally displaceable fashion in a housing and which is acted on counter to the defined operating state of the parking lock valve, by a spring force of a spring device, and to which, in the region of control surfaces, the actuation pressure and the pressure signals can be applied.

The parking lock device can be actuated with little outlay, and a disengagement of the parking lock device can be prevented in a structurally simple manner, if the actuation pressure is, in a first switching position of the valve slide of the parking lock valve, isolated from the parking lock cylinder in the region of the parking lock valve.

If the actuation pressure of the parking lock device can, in a second switching position of the valve slide of the parking lock valve, be applied in the region of the parking lock cylinder and in the region of two facing control or face surfaces of two valve slide regions of the valve slide, the diameters of which differ from one another such that the actuation pressure results in an actuating force acting on the valve slide in the direction of the second switching position, the self-holding action of the parking lock valve can be realized with a small installation space requirement for the parking lock valve, and can be implemented by a one-piece, stepped valve slide.

In an embodiment of the electrohydraulic transmission control system which is likewise expedient in terms of installation space, the pressure signal which is adjustable in the region of the additional electrohydraulic pressure adjuster can be applied in the region of a control surface of the valve slide of the parking lock valve, such that, when the pressure signal is applied, an actuating force acting in the direction of the first switching position acts on the valve slide.

The electrohydraulic transmission control system according to the invention can be designed expediently in terms of installation space, by a one-piece, stepped valve slide in the region of the parking lock valve, if the pressure signal which is adjustable in the region of the additional electrohydraulic pressure adjuster can be applied in the region of a control surface of the valve slide of the parking lock valve, such that, when the pressure signal is applied, an actuating force acting in the direction of the first switching position acts on the valve slide.

In a refinement of the electrohydraulic transmission control system which can likewise be implemented with a one-piece, stepped valve slide of the parking lock valve, the pressure signal of the electrohydraulic pressure adjuster is, in the second switching position of the valve slide of the parking lock valve, applied in the region of two facing face surfaces of two valve slide regions of the valve slide, the diameters of which differ from one another such that an actuating force acting on the valve slide in the direction of the first switching position results from the actuation pressure.

In an embodiment of the electrohydraulic transmission control system according to the invention which is easy to operate, the electrohydraulic pressure adjuster is designed as a pressure adjuster with a falling pressure characteristic curve versus the actuation current, and the further electrohydraulic pressure adjuster and the additional electrohydraulic pressure adjuster are designed as pressure adjusters with a rising pressure characteristic curve versus the actuation current, whereas the actuation pressure increases with increasing pressure signal of the electrohydraulic pressure adjuster, the actuation pressure of the shift element during emergency operation being at least approximately equal to zero or having a pre-fill pressure level.

In an embodiment of the electrohydraulic transmission controller according to the invention which can be designed with greater degrees of freedom, the valve slide of the parking lock valve includes two separate valve slide parts which are arranged spaced apart from one another in an axial direction in the housing, and so that they are longitudinally displaceable relative to one another and between which the spring device is arranged, wherein the first valve slide part can be transferred into its first axial position by the second valve slide part.

In a structurally simple embodiment of the electrohydraulic transmission control system, the second valve slide part is spring-loaded by the spring device in the direction of a stop, and can be displaced counter to the spring force of the spring device, in the direction of the first valve slide part, by the pressure signal of the additional electrohydraulic pressure adjuster.

Both, the features specified in the patent claims and the features specified in the following exemplary embodiments of the electrohydraulic transmission control system according to the invention are suitable, in each case individually or in any desired combination with one another, for refining the subject matter according to the invention.

Further advantages and advantageous embodiments of the electrohydraulic transmission control system according to the invention will emerge from the patent claims and from the exemplary embodiments described in principle below with reference to the drawings, wherein, in the following description, for the sake of clarity, the same reference designations are used for structurally and functionally identical components.

BRIEF DESCRIPTION OF THE DRAWINGS

The invention is described more specifically by example on the basis of the attached figures. The following is shown:

FIG. 2a to FIG. 2d show a parking lock valve of the electrohydraulic transmission control system as per FIG. 1 during different operating states of the transmission control system;

FIG. 4a to FIG. 4d show the parking lock valve of the electrohydraulic transmission control system as per FIG. 3 during different operating states of the transmission control system; and FIG. 5a to FIG. 5d show an alternatively designed parking lock valve of the electrohydraulic transmission control system as per FIG. 3 during different operating states of the transmission control system.

DETAILED DESCRIPTION

Figure 1:
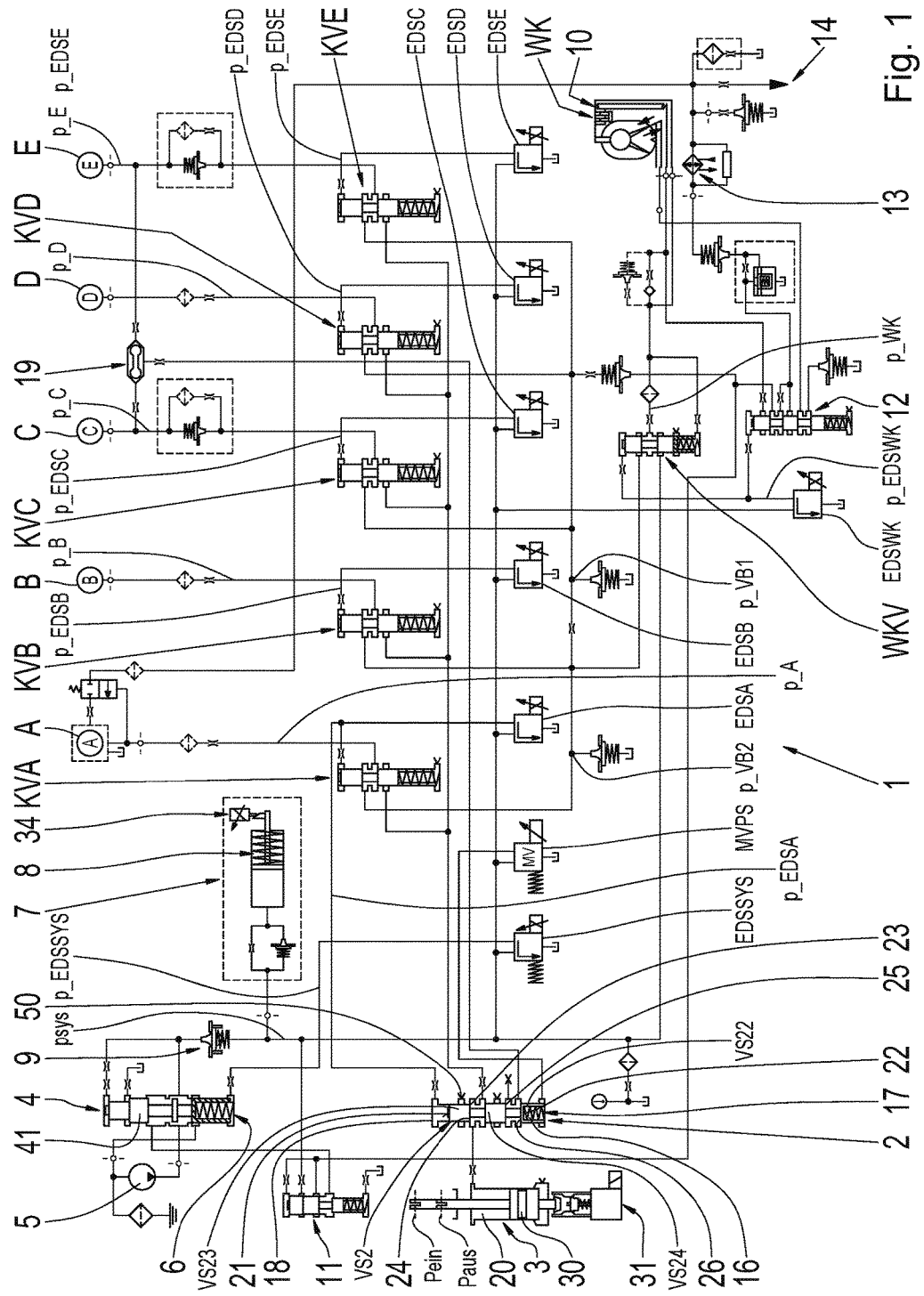
FIG. 1 shows a hydraulic layout of a first embodiment of the electrohydraulic transmission control system according to example aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a hydraulic layout of an embodiment of an electrohydraulic transmission control system 1 having a parking lock valve 2, by which a parking lock cylinder 3 can be charged with an actuation or system pressure p_sys. The electrohydraulic transmission control system 1 is provided for actuating a transmission, preferably an automatic transmission, in which eight ratios for forward travel and at least one ratio for reverse travel can be realized. During the realization of the ratios, a power flow can be enabled between a transmission input shaft and a transmission output shaft in each case by selective activation and deactivation of shift elements A to E of the transmission. Furthermore, a so-called neutral operating state can be realized in the region of the transmission during which the power flow between the transmission input shaft and the transmission output shaft is disconnected through corresponding actuation of the shift elements A to E. Furthermore, a "parking operating state" can be realized by the transmission, during which the transmission output shaft is, in a manner known per se, held rotationally fixed by a parking lock device which can be actuated by the parking lock cylinder 3.

The shift elements A to E can be charged with actuation pressures p_A to p_E which are adjustable in the region of valve devices KVA to KVE. In the non-actuated operating state, a pre-fill pressure p_VB1 or p_VB2, respectively, prevails at the valve devices KVA to KVE. Furthermore, a converter lock-up clutch WK can be charged with an actuation pressure p_WK which is adjustable in the region of a converter clutch valve WKV. Electrohydraulic pressure adjusters EDSA to EDSE and EDSWK are assigned to each of the valve devices KVA to KVE and WKV, the system pressure p_sys which is adjustable in the region of a system pressure valve 4 prevailing at the electrohydraulic pressure adjusters EDSA to EDSE and EDSWK in the region of which in each case one pilot pressure p_EDSA to p_EDSE and p_EDSWK can be adjusted.

By a preferably mechanically driven pump device 5, which constitutes a pressure source of the electrohydraulic transmission control system 1, a supply pressure is provided, which prevails in the region of the system pressure valve 4, when a drive machine of a vehicle drivetrain including the gearbox is active. At the system pressure valve 4, a pilot pressure p_EDSSYS can be applied which is adjustable in the region of an electrohydraulic pressure adjuster EDSSYS, the pilot pressure p_EDSSYS acting in the same direction as a spring device 6, to a valve slide 41 of the system pressure valve 4, wherein, in the present case, the system pressure p_sys increases with increasing pilot pressure p_EDSSYS.

In order to be able, in certain operating situations of the transmission, to briefly compensate instances of undersupply from the pump device 5, a hydraulic fluid volume accumulator 7 is provided, in the region of which a hydraulic fluid volume can be temporarily stored counter to the spring force of a spring device 8, which hydraulic fluid volume can, in accordance with demand, be introduced into the line system of the electrohydraulic transmission control system 1 downstream of a check valve device 9. In this way, a hydraulic supply can be provided to the transmission control system 1 as desired within short operating times.

In addition to the shift elements A to E, the transmission includes a launch component 10 which in the present case is designed as a hydrodynamic torque converter and which can be locked up, in a manner dependent on the operating state, by the converter lock-up clutch WK. The launch component 10 and the converter lock-up clutch WK can be actuated as desired not only by the converter clutch valve WKV but also by further valve devices 11 and 12. Downstream of the valve device 12 there is provided a cooler 13 which is connected upstream of a lubricating circuit 14.

In the actuated operating state of the shift elements A to E, the valve devices KVA to KVE are pilot-operated by the electrohydraulic pressure adjusters EDSA to EDSE, in each case by pilot pressures p_EDSA to p_EDSE, in such a way that the system pressure p_sys prevailing in each case in the region of the valve devices KVA to KVE is applied, having been correspondingly converted as required, in the region of actuation pistons (not illustrated any more detail) of the shift elements A to E, in each case as actuation pressure p_A to p_E. Here, the system pressure p_sys corresponds in each case to the maximum actuation pressure p_A to p_E that can be realized.

In order to be able to charge the parking lock cylinder 3, in accordance with demand, with the system pressure p_sys for disengaging the parking lock device or for hydraulically holding the parking lock device in the disengaged state via the parking lock valve 2 with the system pressure p_sys, the pilot pressure p_EDSA, which is adjustable in the region of the electrohydraulic pressure adjuster EDSA, can be applied in the region of a control surface 21 of a valve slide VS2 of the parking lock valve 2. Here, the valve slide VS2 of the parking lock valve can be transferred from its first switching position illustrated in FIG. 2a, which corresponds to an engaged operating state of the parking lock device, via an intermediate position illustrated in FIG. 2b into the second switching position shown in more detail in FIG. 2c, which corresponds to a disengaged operating state of the parking lock device.

In addition to the pilot pressure p_EDSA and the system pressure p_sys, which simultaneously constitutes the actuation pressure of the parking lock cylinder 3, a pressure signal p_MVPS which is adjustable in the region of a further electrohydraulic pressure adjuster MVPS, which in the present case is designed as a solenoid valve, can be applied in the region of a spring chamber 16 of the parking lock valve 2, in which spring chamber a spring device 17 of the parking lock valve 2 is arranged. In the present case, the spring chamber 16 is delimited by a housing 18 and by the valve slide VS2 of the parking lock valve 2, wherein the pressure signal p_MVPS can be applied in the region of a further control surface 22 of the valve slide VS2 of the parking lock valve 2, acting in the same direction as the spring force of the spring device 17. Both the spring force of the spring device 17 and the pressure signal p_MVPS act on the valve slide VS2 in the direction of its first switching position.

Furthermore, via a ball-type change-over valve 19, that actuation pressure p_C or p_E of the shift element C or E respectively prevails at the parking lock valve 2 which presently has a higher value in each case. Here, in the second switching position of the valve slide VS2 as illustrated in FIG. 2c, the actuation pressure p_C or p_E prevails in the region of two facing control surfaces 23, 24 of two valve slide regions VS23 and VS24. The diameter of the valve slide region VS23 is smaller than the diameter of the valve slide region VS24, such that the actuation pressure p_C or p_E, like the pilot pressure p_EDSA, acts on the valve slide VS2 in the direction of its second switching position, or, more specifically, the respectively prevailing actuation pressure p_C or p_E results in an actuation force or actuating force which acts on the valve slide VS2 in the direction of its second switching position. In the first switching position of the valve slide VS2 as illustrated in FIG. 2a or FIG. 2b, the actuation pressure p_C or p_E does not result in an actuation force in the direction of the second switching position, because the second valve slide region VS24 separates the control surfaces 23 and 24 from the actuation pressure p_C or p_E.

In the second switching position of the valve slide VS2 as illustrated in FIG. 2c, the system pressure p_sys additionally prevails at the control surfaces 25 and 26 of the second valve slide region VS24 and of a third valve slide region VS22 of the valve slide VS2. The diameter of the second valve slide region VS24 is in turn smaller than the diameter of the valve slide region VS22. For this reason, the system pressure p_sys prevailing in the region of the control surfaces 25 and 26 in the second switching position of the valve slide VS2 results in turn in an actuation force which acts on the valve slide VS2 in the direction of its second switching position, which actuation force is equal to zero in the first switching position of the valve slide VS2 as illustrated in FIG. 2a because, in the first switching position of the valve slide VS2, the actuation pressure or the system pressure p_sys prevails neither at the control surface 25 nor at the control surface 26.

In the present case, the control surfaces 21 to 26 of the valve slide VS2 and the spring force of the spring device 17 are coordinated with one another such that, during normal operation of the electrohydraulic transmission control system 1, in which the electrohydraulic pressure adjusters EDSA to EDSE, MVPS and EDSSYS can be fed with current, the parking lock device can be transferred into its engaged operating state or into its disengaged operating state in the manner described in more detail below.

Proceeding from the engaged operating state Pein of the parking lock device, and in the presence of a demand for disengagement of the parking lock device, the parking lock valve 2, which is then in the operating state illustrated in FIG. 2a, is transferred into the operating state illustrated in FIG. 2c by application of the pilot pressure p_EDSA in the region of the control surface 21. This has the effect that the system pressure p_sys prevailing at the parking lock valve 2 is transmitted via the parking lock valve 2 in the direction of the parking lock cylinder 3, and a piston chamber 20 of the parking lock cylinder 3 is charged with the system pressure p_sys. Here, a piston 30 of the parking lock cylinder 3 is displaced from its position corresponding to the engaged operating state Pein of the parking lock device into the position corresponding to the disengaged operating state Paus of the parking lock device by the prevailing system pressure p_sys counter to a spring device (not illustrated in any more detail) of the parking lock device. When the position that corresponds to the disengaged operating state Paus of the parking lock device is reached, an electrically actuable locking device 31 arrests or stops the piston 30, which is then held redundantly, both by the system pressure p_sys and by the locking device 31, in the position that corresponds to the disengaged operating state Paus of the parking lock device.

Proceeding from the operating state of the parking lock valve illustrated in FIG. 2c with a simultaneously disengaged parking lock device, during normal operation of the electrohydraulic transmission control system 1, in the event of a demand for engagement of the parking lock device, the pilot pressure p_EDSA is reduced to zero and, at the same time, the pressure signal p_MVPS of the solenoid valve MVPS is applied to the valve slide VS2 of the parking lock valve 2 in the region of the control surface 22. Here, the control surfaces 21, 22, 23, 24, 25, 26 of the valve slide VS2 and the spring force of the spring device 17 are coordinated with one another such that the valve slide VS2 can be transferred from the second switching position in the direction of the first switching position of the valve slide VS2 by the spring device 17 and the pressure signal p_MVPS, despite the system pressure p_sys and clutch pressure p_C/E and pressure regulator pressure p_EDSA prevailing in the region of the control surfaces 21, 23, 24, 25, 26, in which first switching position the piston chamber 20 of the parking lock cylinder 3 is connected via the parking lock valve 2 to a substantially unpressurized region 50 of the transmission, which is preferably an oil sump. Furthermore, the locking device 31 is switched into a deenergized state, and the piston 30 of the parking lock cylinder 3 is mechanically unlocked, whereby the piston 30 can be displaced by the spring device of the parking lock device into its position that corresponds to the engaged operating state Pein of the parking lock device.

In the present case, the control surfaces 21 to 26 of the valve slide VS2 and the spring force of the spring device 17 are also coordinated with one another such that the valve slide VS2 can be transferred from its first switching position into its second switching position by a pilot pressure p_EDSA of approximately three and a half (3.5) bar, counter to the spring force of the spring device 17, if the pressure signal p_MVPS of the solenoid valve MVPS is substantially equal to zero or, more specifically, substantially corresponds to the ambient pressure of the transmission, which generally prevails in all regions of the parking lock valve 2 in addition to the pressure signals and which thus has no effect.

At the latest when the second switching position of the valve slide VS2 is reached, the system pressure p_sys prevails again at the control surfaces 23 and 24 of the valve slide VS2. By the system pressure p_sys, the self-holding action of the parking lock valve 2 is activated if the system pressure p_sys is approximately seven (7) bar. If the actuation pressure p_C or p_E of the shift element C or E respectively prevails in the region of the control surfaces 25 and 26 in addition to the system pressure p_sys, the self-holding action of the parking lock valve 2 is activated already at a pressure of the system pressure p_sys of approximately two (2) bar, and the valve slide VS2 can no longer be transferred into its first switching position by the spring device 17 alone.

During normal operation of the transmission control system 1, through corresponding adjustment of the pilot pressure p_EDSA, the shift element A is charged with the actuation pressure p_A, and incorporated into the power flow, during the realization of the park operating state, the neutral operating state, the realization of the ratio for reverse travel, and during the realization of the ratios "1" and "2" for forward travel and for the realization of the ratios "7" and "8". The pressure signal or the pilot pressure p_EDSA is therefore particularly suitable for transferring the parking lock valve 2 from the operating state illustrated in FIG. 2a in the direction of the operating state shown in FIG. 2c counter to the spring device 17 in the manner described above. To prevent undesired disengagement of the parking lock by the then respectively prevailing pressure signal p_EDSA, the valve slide VS2 is charged with the pressure signal p_MVPS in the region of its control surface 22 in the corresponding presence of a demand for engagement of the parking lock device.

Furthermore, either the shift element C or the shift element E is activated in each case in order to realize the ratio "1" to "8" for forward travel, for which reason in each case either the actuation pressure p_C or the actuation pressure p_E is available for holding the valve slide VS2 of the parking lock valve 2 in the operating state illustrated in FIG. 2c and for enabling the parking lock device to be held in the disengaged operating state Paus also hydraulically, through corresponding charging of the parking lock cylinder 3 with the system pressure p_sys, in addition to the mechanical locking in the region of the locking device 31.

If the current-feed of the electrohydraulic transmission control system 1 fails, this has the effect that the pilot pressures p_EDSA to p_EDSE fall to zero, owing to the configuration, described in more detail below, of the electrohydraulic pressure adjusters EDSSYS, MVPS and EDSA to EDSE, whereas the pressure signal p_EDSSYS assumes its maximum value. Furthermore, in the deenergized operating state of the solenoid valve MVPS, the pressure signal p_MVPS is also equal to zero.

This results from the fact that the pressure adjusters EDSA to EDSE are formed with a positive or rising pressure characteristic curve versus the actuation current, whereas the electrohydraulic pressure adjuster EDSSYS has a negative or falling pressure characteristic curve versus the actuation current. Thus, during hydraulic emergency operation of the electrohydraulic transmission control system 1, the system pressure valve 4 is charged with the maximum pressure value of the pressure signal p_EDSSYS, whereby the system pressure p_sys assumes its maximum value for as long as the pump device 5 provides a corresponding supply pressure. This has the effect that the hydraulic fluid volume accumulator 7 is also charged with the maximum system pressure p_sys and gets filled completely.

A detent device 34 of the hydraulic fluid volume accumulator 7 is likewise deactivated in the event of an electrical failure of the electrohydraulic transmission control system 1. The hydraulic fluid volume stored in the region of the hydraulic fluid volume accumulator 7 is introduced, upstream of the parking lock valve 2, into the line system of the transmission control system 1 if the system pressure p_sys falls below a defined pressure level of the system pressure p_sys, which in the present case lies at approximately seven (7) bar. In this way, the system pressure p_sys is held at the pressure level of approximately seven (7) bar for a limited time period until leakages of the transmission control system 1 cause a pressure drop of the system pressure p_sys.

For as long as the pump device 5 provides an adequately high supply pressure, the self-holding action of the parking lock valve 2 remains active during emergency operation, and the valve slide VS2 is held in the operating state shown in FIG. 2d by the prevailing system pressure p_sys. However, if a motor or drive machine which drives the pump device 5 is deactivated during emergency operation of the transmission control system 1, the pressure level of the system pressure p_sys initially falls, for supply-related reasons, to the pressure level of approximately seven (7) bar provided by the hydraulic fluid accumulator 7. This has the result that, in the event of the self-holding pressure threshold of the system pressure p_sys being undershot, the valve slide VS2 is immediately transferred, by the spring device 17, into its first switching position in which the system pressure p_sys is isolated from the parking lock cylinder 3 in the region of the parking lock valve 2, and the piston chamber 20 of the parking lock cylinder 3 is ventilated in the direction of the unpressurized region via the parking lock valve 2. Since the locking device 31 of the parking lock cylinder 3 is already deactivated during emergency operation, the parking lock device engages in the desired manner, and a vehicle is transferred into a safe operating state.

In the present case, the self-holding pressure threshold of the parking lock valve 2 effective during emergency operation of the transmission control system 1 during the deactivation of the pump-side pressure supply is greater than the system pressure p_sys provided by the hydraulic fluid accumulator 7, whereby, in the event of a drop of the system pressure p_sys to the pressure level of the hydraulic fluid volume accumulator 7, the parking lock valve 2 is immediately transferred by the spring device 17, owing to the design, into the operating state illustrated in FIG. 2a, and the parking lock device is transferred into its engaged operating state.

Figure 3:
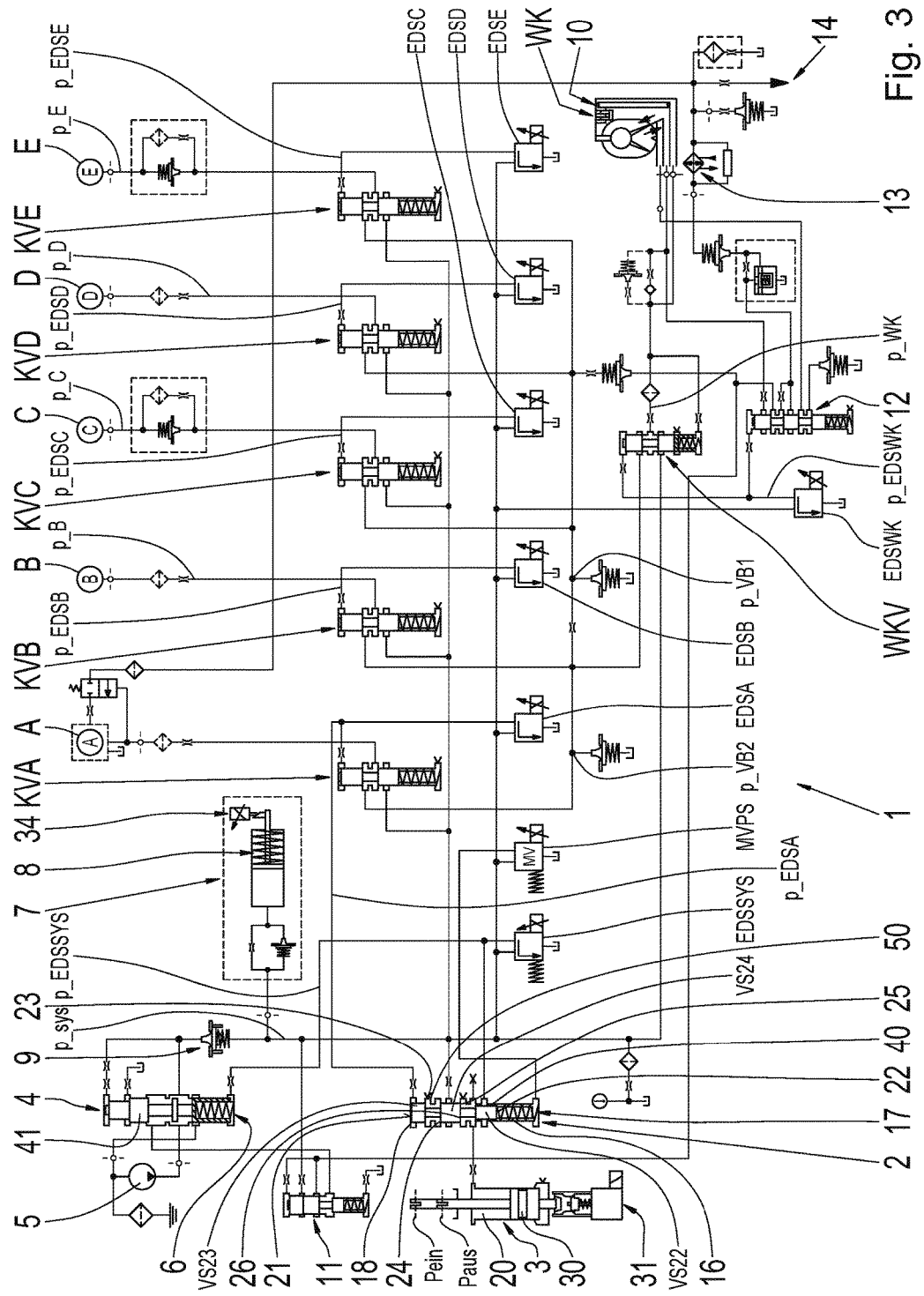
FIG. 3 shows an illustration, corresponding to FIG. 1, of a second embodiment of the transmission control system according to example aspects of the invention.
Figure 4B:
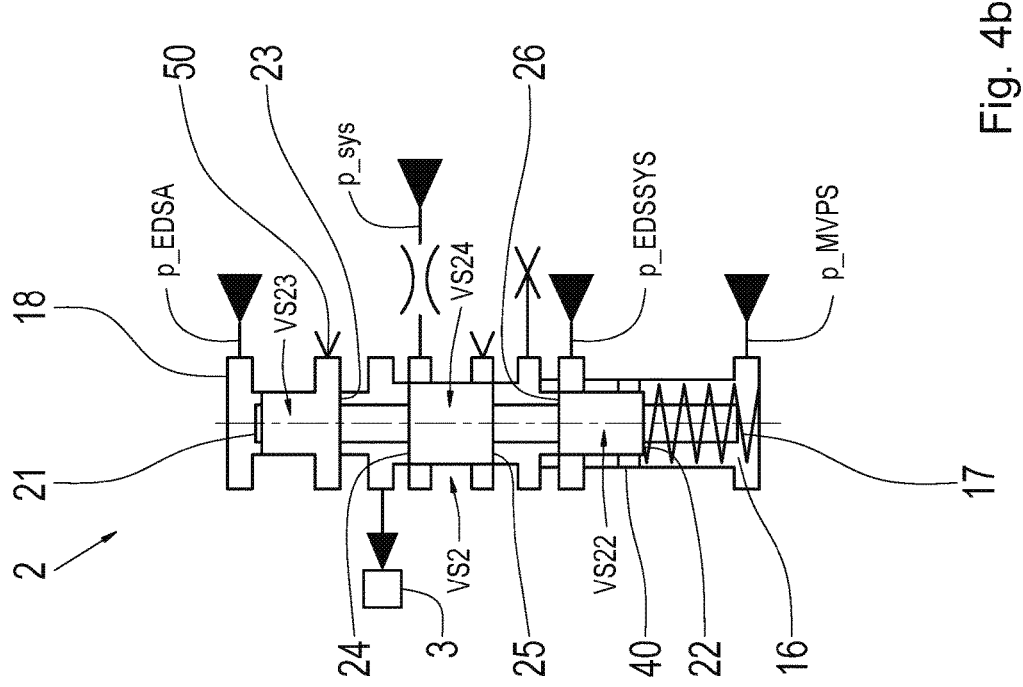
Figure 4A:
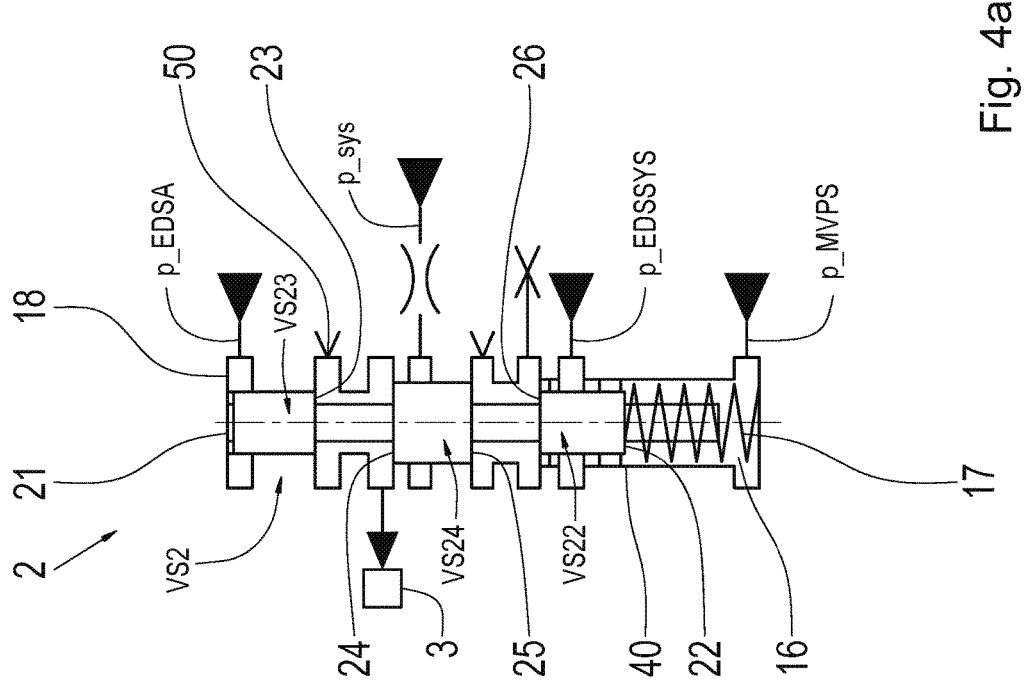

FIG. 3 shows an illustration, corresponding to FIG. 1, of a second exemplary embodiment of the electrohydraulic transmission control system 1, which substantially corresponds to the transmission control system as per FIG. 1 aside from the design of the parking lock valve 2, for which reason substantially only the differences between the two embodiments will be discussed in more detail below on the basis of the illustrations as per FIG. 4a to FIG. 4d, and with regard to the further functioning of the transmission control system 1 as per FIG. 3, reference is made to the above description relating to FIG. 1 and FIG. 2a to FIG. 2d.

The parking lock valve 2 of the transmission control system 1 as per FIG. 3 includes, in turn, the three valve slide regions VS22, VS23 and VS24, wherein the diameter of the valve slide region VS23 is smaller than the diameter of the valve slide region VS24, which in turn is larger than the diameter of the valve slide region VS22, which, for ease of assembly of the parking lock valve 2, is guided in the housing 18 in the region of a so-called reduction sleeve 40, which in the present case is fixedly connected to the housing 18.

The pressure signal p_EDSA of the electrohydraulic pressure adjuster EDSA can in turn be applied in the region of the control surface 21 of the valve slide VS2 of the parking lock valve 2, the pressure signal p_EDSA acting toward the second switching position of the valve slide VS2. Furthermore, the pressure signal p_MVPS of the solenoid valve MVPS can in turn be applied to the valve slide VS2, in the region of the control surface 22 of the valve slide VS2, acting in the same direction as the spring device 17 in the direction of its first switching position, whereas, in the second switching position of the valve slide VS2 as illustrated in FIG. 4c, the system pressure p_sys prevails in the region of the control surfaces 23 and 24 of the valve slide regions VS23 and VS24.

Furthermore, the pressure signal p_EDSSYS which is adjustable in the region of the electrohydraulic pressure adjuster EDSSYS prevails in the region of the control surfaces 25 and 26 of the valve slide regions VS24 and VS22 when the valve slide VS2 of the parking lock valve 2 is situated in its second switching position.

Here, the control surfaces 21 to 26 of the valve slide VS2 and the spring force of the spring device 17 of the parking lock valve 2 as per FIG. 4a to FIG. 4d are coordinated with one another such that, during normal operation of the transmission control system 1 as per FIG. 3, the valve slide VS2 is, above a pressure level of three and a half (3.5) bar of the pressure signal p_EDSA of the electrohydraulic pressure adjuster EDSA, transferred from its first switching position into its second switching position, and held therein, counter to the spring force of the spring device 17 alone. Furthermore, the parking lock valve 2 is designed such that, during normal operation of the transmission control system, a pressure level of approximately two (2) bar of the system pressure p_sys is sufficient to activate the self-holding action of the parking lock valve 2 counter to the spring force of the spring device 17, wherein, for this purpose, the pressure signal p_EDSSYS of the electrohydraulic pressure adjuster EDSSYS must be set to substantially equal to zero.

Owing to the valve boosting action that prevails in the region of the system pressure valve 4, the self-holding pressure threshold amounts, in the case of pressure signals p_sys and p_EDSSYS simultaneously acting on the parking lock valve 2, to a pressure level of the system pressure p_sys of approximately seven (7) bar, whereby, upon a transition from the normal operation of the transmission control system 1 to hydraulic emergency operation, the effect described in more detail below is achieved.

Since, during hydraulic emergency operation of the transmission control system 1, both the pressure signal p_EDSA and the pressure signal p_MVPS are substantially equal to zero and both the pressure signal p_EDSSYS and the system pressure p_sys assume their maximum values, the parking lock valve 2 is, upon a transition of the transmission control system 1 to emergency operation proceeding from driving operation in a forward direction of travel, held in the operating state illustrated in FIG. 4d by the prevailing system pressure p_sys counter to the pressure signal p_EDSSYS likewise prevailing at the valve slide VS2. If the pressure supply from the pump device is deactivated or interrupted for example as a result of a shutdown of the drive machine, the system pressure p_sys and thus also the pressure signal p_EDSSYS abruptly decrease.

When the pressure level of the hydraulic fluid accumulator 7 is reached, the spring device 8 thereof expels the hydraulic fluid volume stored in the region of the hydraulic fluid accumulator 7, whereby the pressure level of the system pressure p_sys and the pressure level of the pressure signal p_EDSSYS likewise prevailing at the parking lock valve 2 are of substantially the same magnitude and correspond to the expulsion pressure level of the hydraulic fluid accumulator 7. This has the effect that the valve slide VS2 is immediately transferred from its second switching position into its first switching position by the spring device 17 and by the prevailing pressure signal p_EDSSYS counter to the prevailing system pressure p_sys, and the parking lock device is transferred in the manner described above into its engaged operating state Pein without a delay.

Thus, it is also the case in the second embodiment of the transmission control system 1 as per FIG. 3 that, owing to the different self-holding pressure levels which take effect during normal operation and during emergency operation of the transmission control system 1, it is firstly possible to realize energy-optimized operation of a transmission, and secondly, it is possible to realize immediate engagement of the parking lock in the event of a shutdown of the drive machine during emergency operation.

FIGS. 5a to 5d show an alternative embodiment of the parking lock valve 2 of the transmission control system 1 as per FIG. 3, in which the valve slide VS2 includes two valve slide parts VS2A and VS2B, whereby the parking lock valve 2 is formed with a two-part, stepped valve slide VS2. In the operating state of the parking lock valve 2 illustrated in FIG. 5b, the two valve slide parts VS2A and VS2B are arranged spaced apart from one another in an axial direction, and so as to be longitudinally displaceable relative to one another, in the housing 18. Here, the first valve slide part VS2A of the parking lock valve 2 as per FIG. 5a to FIG. 5d and the one-piece valve slide VS2 of the parking lock valve 2 as per FIG. 4a to FIG. 4d have substantially the same functionality and mode of operation, whereas the second valve slide part is provided merely for an actuation of the first valve slide part VS2A proceeding from the second axial position of the first valve slide part VS2A illustrated in FIG. 5d in the direction of the first axial position illustrated in FIG. 5a.

The spring device 17 is arranged between the two valve slide parts VS2A and VS2B, whereby, in the presence of a correspondingly small pressure signal p_MVPS, the second valve slide part VS2B is transferred by the spring device 17 into the position shown in FIG. 5b to FIG. 5d, whereas, depending on the respectively acting pressure signals p_EDSA and p_EDSSYS, the first valve slide part VS2A is present either in the first or second axial position illustrated in FIG. 5a or in FIG. 5c. This results from the fact that the second valve slide part VS2B is spring-loaded by the spring device 17 in the direction of a stop 45 and can be displaced counter to the spring force of the spring device 17, in the direction of the first valve slide part VS2A, by the pressure signal p_MVPS.

In the present case, the pressure signal p_EDSSYS can be applied in the region of the control surface 25 of the valve slide region VS24 of the first valve slide part VS2A and in the region of the control surface 26 of the second valve slide part VS2B, whereas, in the second axial position of the first valve slide part VS2A of the valve slide VS2, the system pressure p_sys prevails in the region of the mutually corresponding control surfaces 23 and 24 of the valve slide region VS24 and of the valve slide region VS23 and additionally at a further control surface 27 of the valve slide region VS23 of the first valve slide part VS2A, whereby the first valve slide part VS2A is acted on by an actuating force which results from the acting system pressure p_sys and which in turn acts in the direction of the second switching position of the first valve slide part VS2A.

It is also the case in the embodiment of the parking lock valve 2 illustrated in FIG. 5a to the FIG. 5d that the control surfaces 21 to 27 and the spring force of the spring device 17 are coordinated with one another such that the parking lock valve 2 can be transferred into and held in the operating state illustrated in FIG. 5c by the pressure signal p_EDSA, counter to the spring force of the spring device 17, above a pressure level of approximately three and a half (3.5) bar, if the pressure signal p_MVPS is substantially equal to zero. In the operating state of the parking lock valve 2 illustrated in FIG. 5c, the system pressure p_sys prevails in the region of the control surfaces 23 and 24 and 27 of the first valve slide region VS2A of the valve slide VS2, wherein the self-holding pressure level of the parking lock valve 2 corresponds, in the presence of a pressure signal p_EDSSYS equal to zero, to a system pressure p_sys of approximately two (2) bar, and the parking lock valve 2 can be held in the operating state illustrated in FIG. 5c, counter to the spring force of the spring device 17, by the system pressure p_sys alone. With rising pressure signal p_EDSSYS, the self-holding pressure threshold corresponds to the sum of the system pressure p_sys and the pressure signal p_EDSSYS which prevails at the first valve slide part VS2A in a direction of action counter to the system pressure p_sys and which is approximately (seven) 7 bar. In a situation of the transmission control system 1 formed with the parking lock valve 2 as per FIG. 5a to FIG. 5d in which the pressure signals p_EDSA and p_MVPS are substantially equal to zero, the pressure signal p_EDSSYS rises to its maximum pressure value owing to the falling pressure characteristic curve of the electrohydraulic pressure adjuster EDSSYS, which likewise results, owing to the design of the system pressure valve 4 described in more detail above, to a rise of the system pressure p_sys to its maximum value. Owing to the valve ratio of the system pressure valve 4, it is thus the case that the self-holding action of the parking lock valve in the operating state illustrated in FIG. 5c and FIG. 5d is ensured even during active emergency operation.

In turn, if the pressure supply from the pump is interrupted as a result of a shutdown of the drive machine of the transmission control system 1, the system pressure p_sys and the pressure signal p_EDSSYS both fall abruptly to the pressure level of the hydraulic fluid accumulator 7 during active emergency operation. This means that the two pressures p_sys and p_EDSSYS are of substantially equal magnitude, and the parking lock valve 2 is immediately transferred by the spring device 17 into an operating state in which the parking lock cylinder 3 is ventilated in the direction of the unpressurized region via the parking lock valve 2, and the parking lock device can be transferred into its engaged operating state as desired with high spontaneity.

Modifications and variations can be made to the embodiments illustrated or described herein without departing from the scope and spirit of the invention as set forth in the appended claims.

REFERENCE DESIGNATIONS

1 Electrohydraulic transmission control system
2 Parking lock valve
3 Parking lock cylinder
4 System pressure valve
5 Pump device
6 Spring device of the system pressure valve
7 Hydraulic fluid volume accumulator
8 Spring device of the hydraulic fluid volume accumulator
9 Check valve device
10 Launch component, torque converter
11, 12 Valve device
13 Cooler
14 Lubrication circuit
16 Spring chamber
17 Spring device
18 Housing
19 Ball-type change-over valve
20 Piston chamber
21 Control surface
22 Further control surface
23 Control surface
24 Control surface
25 Control surface
26 Control surface
27 Control surface
30 Piston of the parking lock cylinder
31 Interlock device of the parking lock cylinder
34 Detent device of the hydraulic fluid volume accumulator
40 Reduction sleeve
41 Valve slide of the system pressure valve
45 Stop
50 Unpressurized region
A to E Shift element
EDSA to EDSE Electrohydraulic pressure adjuster
EDSSYS Electrohydraulic pressure adjuster
EDSWK Electrohydraulic pressure adjuster
KVA to KVE Valve device
MVPS Electrohydraulic pressure adjuster, solenoid valve
p_A to p_E Actuation pressure
Paus, Pein Operating state of the parking lock
p_MVPS Pressure signal
p_EDSSYS Pressure signal
p_EDSA to p_EDSE Pilot pressure
p_sys System pressure
p_VB1, p_VB2 Pre-fill pressure
p_WK Actuation pressure
VS2 Valve slide of the parking lock valve
VS22, VS23, VS24 Valve slide region
VS2A, VS2B Valve slide part
WK Converter lock-up clutch
WKV Converter clutch valve

The invention claimed is:

1. An electrohydraulic transmission control system (1), comprising:
a parking lock valve (2) by which a parking lock cylinder (3) of a parking lock device is chargeable with an actuation pressure (p_sys), the actuation pressure (p_sys) settable in an operating-state-dependent manner by at least one electrohydraulic pressure adjuster (EDSSYS), at least one pressure source (7) or both the at least one electrohydraulic pressure adjuster (EDSSYS) and the at least one pressure source (7),
wherein the electrohydraulic transmission control system (1) is configured such that, during normal operation of the electrohydraulic transmission control system (1) in which the at least one electrohydraulic pressure adjuster (EDSSYS) is actuatable with current, the parking lock valve (2) is holdable in a defined operating state in which the actuation pressure (p_sys) acts on the parking lock cylinder (3) above a normal pressure level, and
wherein the electrohydraulic transmission control system (1) is configured such that, during emergency operation of the electrohydraulic transmission control system (1) in which the at least one electrohydraulic pressure adjuster (EDSSYS) is not fed with current and the actuation pressure (p_sys) is at least temporarily set to an emergency pressure level higher than the normal pressure level by the at least one pressure source (7), a pressure level of the actuation pressure (p_sys) that holds the parking lock valve (2) in the defined operating state corresponds at least approximately to the emergency pressure level.

2. The electrohydraulic transmission control system of claim 1, wherein the parking lock valve (2) is chargeable with a pressure signal (p_ESDA) that is adjustable with a further electrohydraulic pressure adjuster (EDSA) during the normal operation of the electrohydraulic transmission control system (1), the pressure signal (p_EDSA) applicable to the parking lock valve (2) such that the pressure signal (p_EDSA) urges the parking lock valve (2) towards the defined operating state.

3. The electrohydraulic transmission control system of claim 2, wherein the parking lock valve (2) is chargeable with a pressure signal (p_MVPS) that is adjustable with an additional electrohydraulic pressure adjuster (MVPS) during the normal operation of the electrohydraulic transmission control system (1), the pressure signal (p_MVPS) applicable to the parking lock valve (2) such that the pressure signal (p_MVPS) urges the parking lock valve (2) away from the defined operating state.

4. The electrohydraulic transmission control system of claim 3, wherein the parking lock valve (2) is chargeable with a pressure signal that corresponds to an actuation pressure (p_C or p_E) of a shift element (C or E) during normal operation of the electrohydraulic transmission control system (1), the pressure signal applicable to the parking lock valve (2) such that the pressure signal urges the parking lock valve (2) towards the defined operating state.

5. The electrohydraulic transmission control system of claim 4, wherein the parking lock valve (2) is chargeable with a pressure signal (p_EDSSYS) that is adjustable with the at least one electrohydraulic pressure adjuster (EDSSYS) during normal operation, during emergency operation or during both normal and emergency operations of the electrohydraulic transmission control system (1), the pressure signal (p_EDSSYS) applicable to the parking lock valve (2) such that the pressure signal (p_EDSSYS) urges the parking lock valve (2) away from the defined operating state.

6. The electrohydraulic transmission control system of claim 5, wherein the pressure signal (p_EDSSYS) that is adjustable with the at least one electrohydraulic pressure adjuster (EDSSYS) is additionally applicable at a system pressure valve (4), the actuation pressure (p_sys) adjustable with the system pressure valve (4) in a manner dependent on the pressure signal (p_EDSSYS) and on a pressure provided by a further pressure source (5).

7. The electrohydraulic transmission control system of claim 1, wherein the pressure level of the actuation pressure (p_sys) that holds the parking lock valve (2) in the defined operating state during emergency operation is greater than the emergency pressure level when the pressure source is a pump which generates the emergency pressure level.

8. The electrohydraulic transmission control system of claim 1, wherein the pressure level of the actuation pressure (p_sys) that holds the parking lock valve (2) in the defined operating state during emergency operation is greater or less than the emergency pressure level by a defined pressure offset value or is equal to the emergency pressure level when the pressure source (7) is a hydraulic fluid volume accumulator which temporarily provides the emergency pressure level.

9. The electrohydraulic transmission control system of claim 5, wherein the parking lock valve (2) comprises a valve slide (VS2) arranged in a housing (18) such that the valve slide (VS2) is longitudinally displaceable in the housing (18), the valve slide (VS2) urged away from the defined operating state of the parking lock valve (2) by a spring (17), the valve slide (VS2) having a plurality of control surfaces (21 to 27) onto which the actuation pressure (p_sys) and the pressure signals (p_EDSSYS, p_EDSA, p_MVPS, p_C or p_E) are respectively applicable.

10. The electrohydraulic transmission control system of claim 9, wherein the actuation pressure (p_sys) is blocked from the parking lock cylinder (3) by the parking lock valve (2) in a first switching position of the valve slide (VS2).

11. The electrohydraulic transmission control system of claim 10, wherein the actuation pressure (p_sys) is applicable in the parking lock cylinder (3) and two facing control surfaces (23, 24; 25, 26) of two valve slide regions (VS23, VS24; VS24, VS22) of the valve slide (VS2) in a second switching position of the valve slide (VS2), the diameters of the two facing control surfaces (23, 24; 25, 26) differing from each other such that the actuation pressure (p_sys) urges the valve slide (VS2) towards the second switching position.

12. The electrohydraulic transmission control system of claim 10, wherein the pressure signal (p_EDSSYS) that is adjustable with the at least one electrohydraulic pressure adjuster (EDSSYS) is applicable at a control surface (25) of the plurality of control surfaces (21 to 27) to urge the valve slide (VS2) towards the first switching position when the pressure signal (p_EDSSYS) is applied.

13. The electrohydraulic transmission control system of claim 11, wherein the pressure signal (p_EDSSYS) is applicable at the two facing control surfaces (25, 26) in the second switching position of the valve slide (VS2), the diameters of the two facing control surfaces (25, 26) differing from each other such that the pressure signal (p_EDSSYS) urges the valve slide (VS2) towards the first switching position.

14. The electrohydraulic transmission control system of claim 10, wherein the pressure signal (p_MVPS) which is adjustable with an additional electrohydraulic pressure adjuster (MVPS) is applicable at a control surface (22) of the plurality of control surfaces (21 to 27) to urge the valve slide (VS2) towards the first switching position when the pressure signal (p_MVPS) is applied.

15. The electrohydraulic transmission control system of claim 5, wherein the electrohydraulic pressure adjuster (EDSSYS) is a pressure adjuster with a falling pressure characteristic curve versus the actuation current, the further electrohydraulic pressure adjuster (EDSA) and the additional electrohydraulic pressure adjuster (MVPS) are pressure adjusters with a rising pressure characteristic curve versus the actuation current, and the actuation pressure (p_sys) increases with increasing pressure signal (p_EDSSYS) of the electrohydraulic pressure adjuster (EDSSYS), and the actuation pressure (p_C or p_E) of the shift element (C or E) is at least approximately equal to zero or has a pre-fill pressure level during emergency operation.

* * * * *